(12) United States Patent
Okada et al.

(10) Patent No.: US 7,380,054 B2
(45) Date of Patent: May 27, 2008

(54) STORAGE OF FAULT AND POSITION DATA IN NONVOLATILE MEMORY ON SYSTEM COMPONENTS

(75) Inventors: Naoki Okada, Odawara (JP); Nobuyuki Minowa, Oi (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 10/769,889

(22) Filed: Feb. 3, 2004

(65) Prior Publication Data

US 2005/0015647 A1 Jan. 20, 2005

(30) Foreign Application Priority Data

Jun. 27, 2003 (JP) ............................. 2003-183830

(51) Int. Cl.
*G06F 12/00* (2006.01)
(52) U.S. Cl. .................... 711/112; 711/154; 714/25
(58) Field of Classification Search ............ 714/25; 711/112
See application file for complete search history.

(56) References Cited

U.S. PATENT DOCUMENTS 4,970,726 A * 11/1990 Carn et al. ................ 714/25
5,588,144 A 12/1996 Inoue et al.
5,781,767 A 7/1998 Inoue et al.
5,862,404 A 1/1999 Onaga
6,199,175 B1 3/2001 Inoue et al.
6,357,021 B1 3/2002 Kitagawa et al.
6,463,550 B1 10/2002 Cepulis et al.
2003/0208649 A1 11/2003 Merkin

OTHER PUBLICATIONS

The Microsoft Computer Dictionary, 2002, Fifth Edition, pp. 426-427, 521 and 572.*

* cited by examiner

*Primary Examiner*—Donald Sparks
*Assistant Examiner*—Matthew Bradley
(74) *Attorney, Agent, or Firm*—Mattingly, Stanger, Malur & Brundidge, P.C.

(57) ABSTRACT

A storage system includes a plurality of kinds of packages such as channel adapters, cache switches, disk adapters, basic memory boards, a shared memory, cache memories, memory board expansions and individual disk drives. Nonvolatile memories are mounted on each of those packages to store event information concerning the package on which the respective memory is mounted. In case a package is exchanged or newly installed or in case a package fails, the event information is stored in the nonvolatile memory of the package in correspondence with the packaging position information of the package in the storage system, so that this event information can be accessed at any time.

12 Claims, 13 Drawing Sheets

FIG. 3A

| PROM ID | SLOT ID |
|---------|---------|
| PID1 | SID1 |
| PID2 | SID1 |
| ⋮ | ⋮ |
| PIDn | SIDn |

FIG. 3B

| D1 | D2 | D3 | D4 | D5 |
|----|----|----|----|----|
| RECORD NUMBER | DEVICE NUMBER | PK LOCATION | ACTION CONTENTS | DATE |

PK LOCATION:
- PID
- POSITION MANAGEMENT TABLE

ACTION CONTENTS:
- NEW INSTALL
- REPLACE
- EXPAND
- CONTRACT

FIG. 3C

| D11 | D12 | D13 | D14 | D15 |
|-----|-----|-----|-----|-----|
| RECORD NUMBER | DEVICE NUMBER | PK LOCATION | FAULT CONTENTS | DATE |

PK LOCATION:
- PID
- POSITION MANAGEMENT TABLE

FAULT CONTENTS:
- PARITY ERROR
- TIME-OUT
- ADDRESS ERROR
- OTHERS

STORAGE OF FAULT AND POSITION DATA IN NONVOLATILE MEMORY ON SYSTEM COMPONENTS

CROSS REFERENCE TO RELATED APPLICATION

This application relates to and claims priority from Japanese Patent Application No. 2003-183830, filed on Jun. 27, 2003, the entire disclosure of which is incorporated herein by reference.

FIELD OF THE INVENTION

The present invention relates to a storage system that is capable of managing the information on a maintenance operation or a fault, which has occurred in any functional part thereof, easily by accessing the information in a nonvolatile memory provided in the single functional part, and to a method of maintaining the storage system.

BACKGROUND OF THE INVENTION

In a large-scale database system, data is managed by using a dedicated storage system that is separate from a host computer. This storage system, which is called a "disk array device", is configured by arranging a number of disk storages in the form of an array. Such a storage system is typically configured on the basis of a RAID (Redundant Array of Independent Inexpensive Disks) technology, for example. Over a physical storage area owned by the storage system, a logical volume corresponding to a virtual storage area is formed. The host computer is able to read/write desired data by issuing a write command or a read command having a predetermined format to the storage system.

The storage system is constructed of a plurality of kinds of packages. For example, the storage system is constructed to include a plurality of channel adapters, a plurality of disk storages, a plurality of disk adapters, a plurality of cache memories, a plurality of cache switches and a shared memory. Here, each channel adapter controls data transfers with the host computer. Each disk storage is constructed of a plurality of disk drives that store the data to be utilized by the host computer. Each disk adapter controls data transfers between the individual disk storages. Each cache memory temporarily holds the data to be transferred between the host computer and each disk storage. Each cache switch controls the interface of each cache memory. The shared memory stores various commands, various pieces of control information and so on and provides a work area.

The storage system is constructed to include a plurality of packages, each composed of the aforementioned channel adapter, disk storage and disk adapter, so as to provide individual data storage services to a plurality of host computers, thereby to enhance the reliability with use of a redundant configuration. In the case where the host computer writes data in the storage system, for example, it transmits a data writing command to the storage system. This data writing command is received through a communication network by the channel adapter. A microprocessor of the storage system interprets the data writing command and reads out the data assigned by the disk storage through the disk adapter. The read data is temporarily stored in the cache memory and transmitted to the host computer through the channel adapter.

In case a fault occurs in a portion of the storage system, the faulty package is replaced by a normal package. If a fault occurs, a maintenance operator issues a maintenance exchange demand for the faulty package through a maintenance processor. On the basis of the maintenance exchange demand, a shut down is performed in the faulty package, and information concerning the shut down package is written in the shared memory.

In the conventional storage system, when a fault or the like occurs in any package, the information concerning the fault is collected in a maintenance processor (or a maintenance/management terminal). Unless such maintenance/management terminal is used, therefore, information (hereinafter called the "maintenance information") concerning the maintenance operation or the fault cannot be grasped, and the maintenance information cannot be confirmed by access to the package itself. Specifically, the faulty package or the like is normally detached from the storage system of a customer, or the storage system disposed in the evaluation branch of a company, and is sent to another branch, such as a fault analyzing branch, for analysis. However, the single package sent from that branch cannot itself confirm the maintenance information. In the conventional system, therefore, the corresponding maintenance information is exclusively extracted from a number of pieces of maintenance information stored in the maintenance/management terminal, and the package is sent together with the extracted maintenance information to the fault analyzing branch. Then, this branch refers to the maintenance information to analyze the actions of the package and perform various fault repeating tests or the like thereon.

Thus, in the conventional system, the package and the maintenance information are handled separately so that the single package cannot recognize what has happened in the package, thereby to create a problem in that the operation efficiency of the fault analysis or the like is low.

SUMMARY OF THE INVENTION

The present invention has been conceived in view of the above-specified problems, and it is an object of the present invention to provide a storage system which can acquire event information from each of the functional parts which make up the storage system, thereby to improve the efficiency of a fault analyzing operation or the like, and the present invention also relates to a method of maintaining the storage system.

Other objects of the present invention will become more apparent from the following description of various embodiments of the invention.

In order to solve the above-specified problems, according to the present invention, there is provided a storage system comprising a plurality of kinds of exchangeable functional parts for transferring data with a host device, wherein each of the functional parts includes memory means, and wherein each of the memory means has event information stored therein, which information is configured so as to establish a correspondence between an event which has occurred in each of the functional parts and the packaging position information of each of the functional parts.

As the exchangeable functional parts, for example, there can be enumerated a plurality of channel adapters for transferring data with the host device, a plurality of disk storages for storing data received from the host device, a plurality of disk adapters in charge of data transfers with the disk storages, a plurality of cache memories for temporarily storing data to be transferred between the disk storages and the host device, a plurality of cache switches for controlling the interface of the cache memories, and a plurality of shared memories. The memory means is preferably exemplified by a write once or rewritable nonvolatile memory, such as a flash memory or an EEPROM.

The term "event" refers to operations, actions and phenomena performed on the functional parts and is exemplified by the occurrence of a fault or a maintenance operation (e.g., exchange, expand, contract or newly add). The packaging position information is electrical or physical information on the position where the functional part is mounted in the storage system. The event information is configured by establishing a correspondence between the event and the packaging position information. In accordance with the present invention, event information is collected for each of the functional parts and is stored in the memory means located in each respective functional part. As a result, the individual pieces of the event information can be held for the individual functional parts. Even in the case where a functional part is removed from the storage system, the event information can be acquired from the single functional part. Therefore, the operation efficiency of the fault analysis can be improved.

In one mode of the invention, the event information can be read from or written in the memory means from at least either the inside or outside of each of the functional parts.

Specifically, the microprocessor or the like which is packaged in the functional part can access the memory means to read or write the event information. From the outside of the functional part or from the computer terminal connected with another functional part or the storage system, alternatively, access can be made to the memory means of each functional part to read or write the event information. Here, it is unnecessary the event information to be wholly read or written, but it is an option that the event information can be only partially read or written. Moreover, the access method can be set according to the kind of event information. For example, information concerning maintenance can be read from or written in the computer terminal located outside of the functional part, and the information on a fault can be written exclusively from the inside of the functional part, but also can be read from the external computer terminal. In order to prevent unlawful information acquisition by an outsider, moreover, the event information may be encrypted and stored in the memory means so as to allow only a user having an access right to read this information.

In accordance with the present invention, at least either maintenance information on the maintenance of each of the functional parts or fault information on the fault of each of the functional parts is used as the event information.

In one mode of the invention, two kinds of information, i.e., maintenance information and fault information are adopted as the event information. By storing these two kinds of information, an event which has occurred in the functional parts can be more specifically grasped to help in the fault analysis or the like.

In one mode of the invention, each of the functional parts is provided with event detecting means for detecting whether or not a predetermined event has occurred, and in case each of the event detecting means detects a predetermined event, the event information is stored in the memory means corresponding to each of the event detecting means.

The event detecting means can be exemplified by a parity check function for determining whether or not the data has been correctly transferred in the functional part, and a function to discriminate a command for a maintenance operation inputted from the computer terminal connected with the storage system. Each functional part is provided with event detecting means and memory means so that it can detect and store its own state independently of a fault of another functional part. Here, all the functional parts which make up the storage system need not be provided with event detecting means and memory means. For example, some functional parts can be provided with only memory means, while event detection is entrusted to the event detecting means of another functional part.

In another mode of the invention, each of the functional parts is provided with wireless communication means for transmitting event information read from the memory means, wirelessly to the outside of each of the functional parts, through the wireless communication means. As a result, the event information can be transmitted by wireless communication to the computer terminal connected with the receiver, so that the facilities are improved.

The event information can be constructed to include: identification information for identification from another piece of event information; information of the date of occurrence of the event; identification information which identifies the storage system; information on the packaging position of a corresponding one of the functional parts in the storage system; and event contents.

The information for discriminating the event information is enumerated by a record number having a serial number set for each event information. The information for discriminating the storage system serves to discriminate what the storage system is, and it can be exemplified by a device number. The packaging position information can be exemplified by a slot ID indicating the mounting position of each functional part or the device configuration of the storage system. The event contents can be exemplified, in the case of maintenance information, by information indicating the kind of maintenance operation for a new install, replace, expand or contract and, in the case of fault information, by information indicating the kind of fault contents, such as a parity error, a time-out or a critical error. Here, the information should not be limited to the aforementioned, but may contain another piece of information, such as version information indicating the version of the storage system or the name of the maintenance manager. As the data size of the event information becomes larger, however, it is necessary to prepare memory means having a matching memory capacity.

The packaging position information includes at least a location management table composed of: inherent identification information preset in each of the functional parts, and mounting position information given from the storage system to each of the functional parts at the time each of the functional parts is attached to the storage system.

Each functional part is given inherent identification information (i.e., functional part identification information) at the shipping stage, for example. This functional part identification information can be stored in advance in the memory means. When the functional part is attached to the storage system, that is, when the connection terminals of the functional part are electrically connected with the bus of the storage system, this storage system gives the functional part information indicating the attached position of the functional part. The location management table manages the functional part identification information in correspondence with the attached position information, and it indicates the configuration of the storage system. With reference to the location management table, on the basis of the functional part identification information, therefore, it is possible to grasp the attached position of the functional part and the positional relation to another functional part in the storage system.

Moreover, each of the functional parts can include means for stopping the function of each functional part and for inserting/extracting a live wire.

Moreover, the memory means can store the event information as a history. By storing a plurality of pieces of information in a time series, more specifically, the situation before the fault occurs can also be grasped to help with the fault analysis.

According to another aspect of the invention, there is provided a method of maintaining a storage system including a plurality of kinds of exchangeable functional parts, wherein each of the functional parts includes memory means. The storage system maintaining method comprises: the step of detecting whether or not an event of a maintenance operation or a fault has occurred in each of the functional parts; in case an event has been detected, the step of storing the event information, which is constructed by establishing a correspondence between packaging position information of each of the functional parts and the detected event, in the memory means; the step of shutting down the functional part for which the event has been detected; the step of extracting the shut down functional part from the storage system; and the step of acquiring the event information from the memory means disposed in the extracted functional part.

According to another aspect of the invention, there is provided an exchangeable functional part which forms part of a storage system, comprising: event detecting means for detecting whether or not a predetermined event has occurred; and memory means for storing, in case the predetermined event is detected by the detecting means, the event information, which is constructed by establishing a correspondence between the packaged position information of the functional part in the storage system and the predetermined event detected.

BRIEF DESCRIPTION OF THE DRAWINGS

Preferred embodiments of the present invention will now be described in conjunction with the accompanying drawings, in which:

FIGS. 3A to 3C are diagrams showing the configurations of a location management table, maintenance information and fault information, respectively;

DESCRIPTION OF THE PREFERRED EMBODIMENTS

Various embodiments of the present invention will be described in conjunction with FIG. 1 to FIG. 14.

1. First Embodiment

A first embodiment of the present invention will be described in conjunction with FIG. 1 to FIG. 8.

Figure 1:
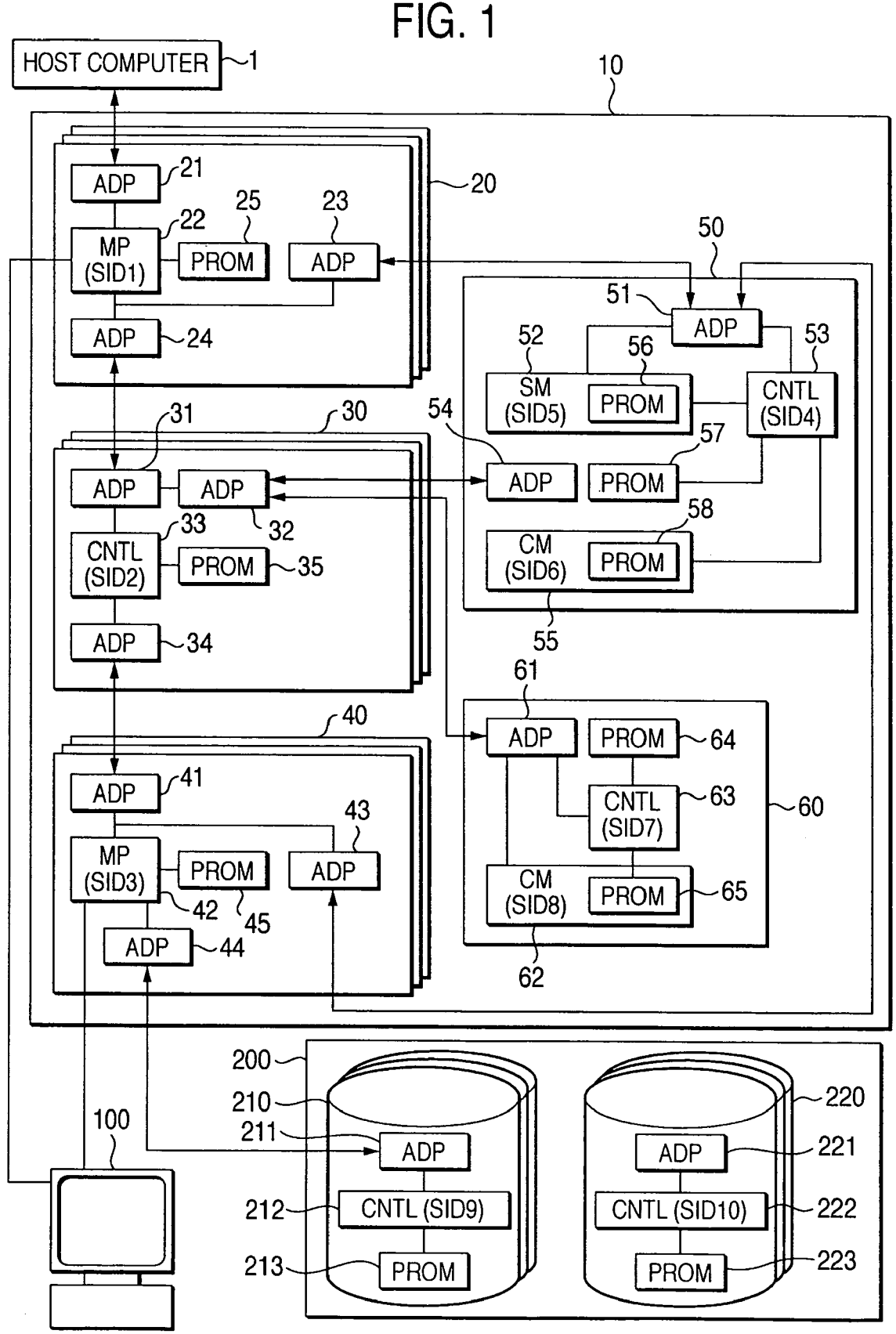
FIG. 1 is an overall block diagram of a storage system according to a first embodiment of the invention.

In FIG. 1, the host computer 1 is a computer system including a CPU (Central Processing unit) and a memory, for example. The CPU of the host computer 1 executes various kinds of programs so as to realize a variety of functions. The host computer 1 is configured as a personal computer, a workstation or a main frame computer, for example. The host computer 1 is connected with a storage system through a LAN (Local Area Network), a SAN (Storage Area Network) or a dedicated line, for example.

The storage system is generally divided into a control device 10 and a disk storage 200, which are configured as disk array subsystems. The control device 10 is provided with a plurality of channel adapters 20, a plurality of cache switches 30, a plurality of disk adapters 40, a plurality of basic memory boards 50 and a plurality of memory board expansions 60.

Each channel adapter 20 controls data transfers between the control device 10 and the host computer. Each channel adapter 20 has packaged therein: an adapter 21 for providing a communication interface with the host computer 1; an MPU (Micro Processing Unit) 22 for overall control of the operations of the channel adapter 20; an adapter 23 for effecting communications with the basic memory board 50; an adapter 24 for effecting communications with the cache switch 30; and a nonvolatile memory 25 for storing event information or the like, as will be described more particularly hereinafter. The nonvolatile memory 25 is rewritable and is exemplified by an EEPROM (Electrically Erasable Programmable Read-Only Memory) or a flash memory. Moreover, the memory 25 can be attached either fixedly or removably. To each channel adapter 20, there is assigned a network address (e.g., an IP address) for identifying the channel adapter 20, so that each channel adapter 20 behaves as one NAS (Network Attached Storage). Therefore, each channel adapter 20 accepts and processes each data input/output demand received from each host computer 1.

Each cache switch 30 serves as a connection means for connecting the basic memory board 50 and the memory board expansion 60, each channel adapter 20, and each disk adapter 40 with each other. Each cache switch 30 is provided with: an adapter 31 for effecting communications with the channel adapter 20; an adapter 32 for effecting communications with the individual memory boards 50 and 60; a controller 33; an adapter 34 for effecting communications with the disk adapter 40; and a nonvolatile memory 35 for storing event information.

Each disk adapter 40 is provided for controlling data transfers with the disk storage 200 in accordance with the RAID configuration. Each disk adapter 40 is provided with: an adapter for effecting communications with the cache switch 30; an MPU 42 for controlling the overall operations; an adapter 43 for effecting communications with the basic memory board 50; an adapter 44 for effecting communications with the disk storage 200; and a nonvolatile memory 45 for storing event information. On the basis of a data writing command received from the host computer 1 by the channel adapter 20, for example, each disk adapter 40 writes data at a predetermined address of a logical volume (Logical Unit) supplied from each disk drive. Here, the disk adapter 40 converts a logical address and a physical address and converts a data access demand for the logical volume into a data access demand for a physical disk.

Each basic memory board 50 provides each channel adapter 20, each disk adapter 40 and so on with a temporary storage area for storage of data, a work area and so on. Each basic memory board 50 is provided with: an adapter 51 for effecting communications with each channel adapter 20 and each disk adapter 40; a shared memory 52 for storing various commands, control information and so on; a control circuit 53; an adapter 54 for effecting communications with each cache switch 30; and a cache memory 55 for storing the data temporarily. Each basic memory board 50 has three nonvolatile memories 56 to 58 packaged therein. These nonvolatile memories 56 to 58 are provided for individual pieces of information. One nonvolatile memory 56 is mounted on a memory module (DIMM: Dual In-line Memory Module) of the shared memory 52, and another nonvolatile memory 58 is mounted on the memory module of the cache memory 55. Another nonvolatile memory 57 is mounted on the substrate of the basic memory board 50. Specifically: the nonvolatile memory 56 that is mounted on the shared memory 52 stores event information for an event that has occurred in the shared memory 52; the nonvolatile memory 58 that is mounted on the cache memory 55 stores event information for an event that has occurred in the cache memory 55; and the nonvolatile memory 57 that is mounted on the memory board stores event information for an event which has occurred in the portion of the basic memory board 50, other than in the shared memory 52 and the cache memory 55. The configuration of the memory board will be further described later in conjunction with FIG. 2.

Each memory board expansion 60 expands the storage capacity of the cache memory and is configured to include: an adapter 61 for effecting communications with the cache switch 30; an add-in cache memory 62; a controller 63; and two nonvolatile memories 64 and 65. The nonvolatile memory 64 is mounted on the substrate of the memory board expansion 60, and the other nonvolatile memory 65 is mounted on the memory module of the add-in cache memory 62. The nonvolatile memory 65 that is mounted on the add-in cache memory 62 stores the event information which has occurred in the add-in cache memory 62. The nonvolatile memory 64 that is mounted on the memory board stores the event information that has occurred in the portion of the memory board expansion 60, other than in the add-in cache memory 62.

A maintenance/management terminal 100 is provided for making various settings, changes and so on of the storage system. The maintenance/management terminal 100 is connected individually with each channel adapter 20 and each disk adapter 40 through the LAN or the like. The maintenance/management terminal 100 is provided with an information display device, such as a display unit, and an information inputting device, such as a keyboard switch or a pointing device, so that it provides a user interface for a maintenance operator. This maintenance operator is able to set the logical volume, to expand and contract each package, to change the RAID configuration and so on by operating the maintenance/management terminal 100, and it is also possible to monitor the action state and the fault occurrence of the disk storage 200 and so on. The maintenance/management terminal 100 can read out the event information stored in the individual nonvolatile memories 25, 35, 45, 56 to 58, 64 and 65 through the MPU 22 of each channel adapter 20, the MPU 42 of each disk adapter 40 and so on, and it can display the event information in the display unit.

The maintenance operator is able, by instructing an actual device slot (as will be called as the "slot ID" and indicated the "SID" in the drawings), to read out the event information from the nonvolatile memory packaged in a desired package and to display it on the screen of the display device. Here, the actual device slot is the identification information fed from a platter and inherent in each package. In the drawing, an identical slot ID is shown for each group for convenience of description. As a matter of fact, however, even packages of the same kind are given different slot IDs according to their mounting positions. Moreover, the term "package" refers to an exchangeable function part and especially corresponds to each channel adapter 20, each cache switch 30, each disk adapter 40, each basic memory board 50, each memory board expansion 60, each cache memory 55 or 62 (or a memory module unit, specifically), each shared memory 52 (at a memory module unit, specifically), and each disk drive 210 or 220. Each package is given inherent identification information (or a package ID, indicated as "PID" in the drawing) at the shipping stage.

When the read command of the event information containing the slot ID is issued from the maintenance/management terminal 100, the event information read command is transmitted through the LAN and the transmission line in the control device 10 to a predetermined package specified by the slot ID. The circuit (e.g., the MPU or the controller) for controlling the actions of the package analyzes the command, reads the event information from the nonvolatile memory included in the package, and returns the event information to the maintenance/management terminal 100. In case the event information is acquired from the nonvolatile memory 25 packaged in a channel adapter 20, more specifically, the command is transmitted from the maintenance/management terminal 100 to a desired channel adapter 20. The MPU 22 of the designated channel adapter 20 reads the event information from the designated address of the nonvolatile memory 25, and sends the event information to the maintenance/management terminal 100. In case the data to be written from the maintenance/management terminal 100 in the nonvolatile memory 25 of the channel adapter 20, the data can be written at a predetermined position of the nonvolatile memory 25 by instructing the slot ID, the storage candidate address of the nonvolatile memory 25 and the data to be written. In case the data is to be read out or written in a package which is not directly connected with the maintenance/management terminal 100, the command is transmitted to the desired package through the channel adapter 20 or the disk adapter 40.

The disk storage 200 is configured by arranging the numerous disk drives 210 and 220 in an array. The disk storage 200 provides the host computer 1 with the storage area managed by the RAID configuration. The disk drive can be exemplified by various devices, such as a hard disk device, a flexible disk device or a semiconductor storage.

The individual disk drives 210 and 220 are provided with adapters 211 and 221, controllers 212 and 222 and nonvolatile memories 213 and 223, respectively. The adapters 211 and 221 are provided for effecting communications with the disk adapter 40. The controllers 212 and 222 are provided for controlling the actions of the drive on the basis of control signals received from the disk adapter 40. The nonvolatile memories 213 and 223 are provided for storing event information concerning an event that has occurred in the disk drive.

As has been described hereinbefore, the storage system is configured to include a plurality of kinds of package groups, each of which is provided with a nonvolatile memory. Moreover, each nonvolatile memory is prestored with the package ID inherent in each package. When each package is attached to the storage system, moreover, it is given a slot ID from the platter. The number of packages are exemplified in the following. The channel adapter 20 has eight packages; the cache switch 30 has four packages; the disk adapter 40 has eight packages; the basic memory board 50 has four packages; the memory board expansion 60 has four packages; and the disk drive has about ten and several to one hundred and several tens of packages.

Figure 2:
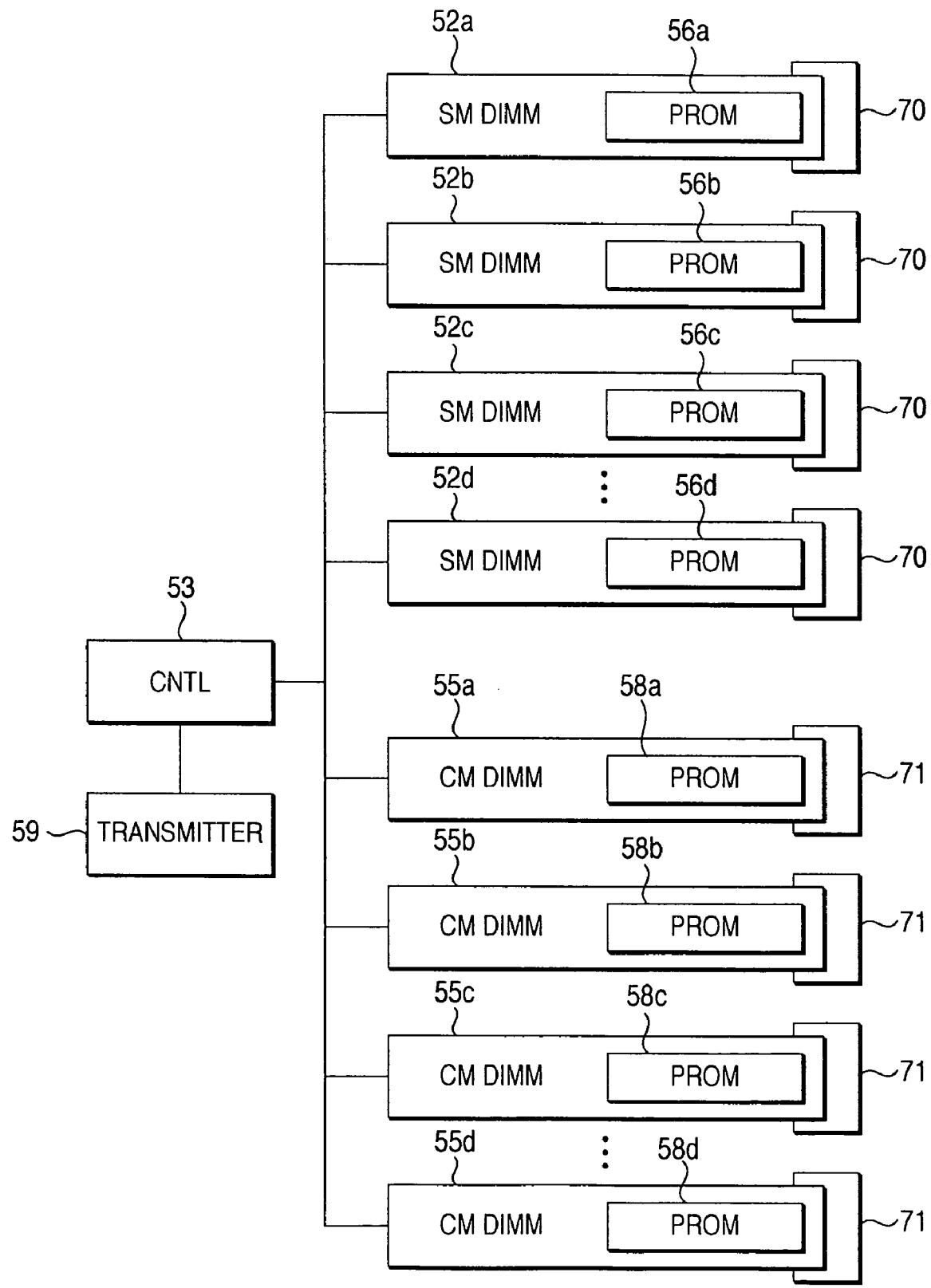
FIG. 2 is a block diagram showing the configuration of a basic memory board.

FIG. 2 shows an example of the configuration of the basic memory board 50. As shown, individual memory modules (DIMM) 52a to 52d which make up the shared memory 52 are removably mounted in memory slots 70. The memory modules 52a to 52d have nonvolatile memories 56a to 56d mounted thereon, respectively. Likewise, individual memory modules 55a to 55d which make up the cache memory 55 are removably mounted on memory slots 71, and nonvolatile memories 58a to 58d are mounted thereon, respectively. Here, in FIG. 2, a transmitter 59 is connected with the control circuit 53 so that it may preferably be used in another embodiment, as will be described hereinafter. The transmitter 59 is not indispensable.

The configurations of a location management table and the event information will be described in conjunction with FIGS. 3A to 3C. FIG. 3A, FIG. 3B and FIG. 3C show an example of the configurations of the location management table, maintenance information and fault information, respectively.

The location management table will be described first. As shown in FIG. 3A, the location management table manages the package IDs (PIDs) of all packages which make up the storage system, and the slot IDs (SIDs) indicating the positions at which the individual packages are mounted in a corresponding relationship. This location management table is stored individually in the nonvolatile memories of all packages and in the storages in the maintenance/management terminal 100. In other words, each package and the maintenance/management terminal 100 individually are able to identify the device configuration of the storage system (that is, what actual device slot a package is mounted in).

As shown in FIG. 3B, the maintenance information or the kind of event information can be composed, in a corresponding manner, of a record number D1, a device number D2, packet location information D3, action contents D4 and a date D5, for example. The record number D1 is a serial number which is used for discriminating other pieces of maintenance information. The device number D2 is information indicating the number of the storage system to which the package is (or has been) attached. The packet location information D3 is position information indicating the position of a packet (or the packaging position) in the device configuration of the storage system. The packet location information D3 contains the package ID that has been assigned in advance to the package and the location management table, which has been described in conjunction with FIG. 3A. Here, the package ID may be stored in another ROM. The action contents D4 is information indicating the contents of the maintenance operation applied to the package. The work contents can be exemplified by a new install, a replace (or exchange), an expand and a contract. The date D5 is information indicating the date (i.e., year, month and date, and hour, minute and second), on which the maintenance operation was carried out.

As shown in FIG. 3C, the fault information or the kind of event information can be composed, in a corresponding manner, of a record number D11, a device number D12, PK location information D13, fault contents D14 and a date D15, for example. The fault information has a structure similar to that of the maintenance information. The record number D11 is a serial number for discriminating other pieces of fault information; the device number D12 is information indicating the number of the storage system to which the package has been attached; the packet location information D13 is position information indicating the position of a packet in the device configuration of the storage system; the fault contents D14 is information indicating the contents of the fault which has occurred in the package; and the date D15 is information indicating the date on which the fault occurred. The fault contents can be exemplified by a parity error, a time-out (no response for a predetermined time period) and an address abnormality.

Here, the structures of the maintenance information and the fault information should not be limited to the ones shown. For example, the structures may be modified to describe the maintenance contents and the fault contents more specifically so as to provide more specific information. For example, the structures can also contain more specific path information of a data transfer that has caused an error (e.g., on what path the error has occurred in the data transferred between the circuits).

Figure 4A:
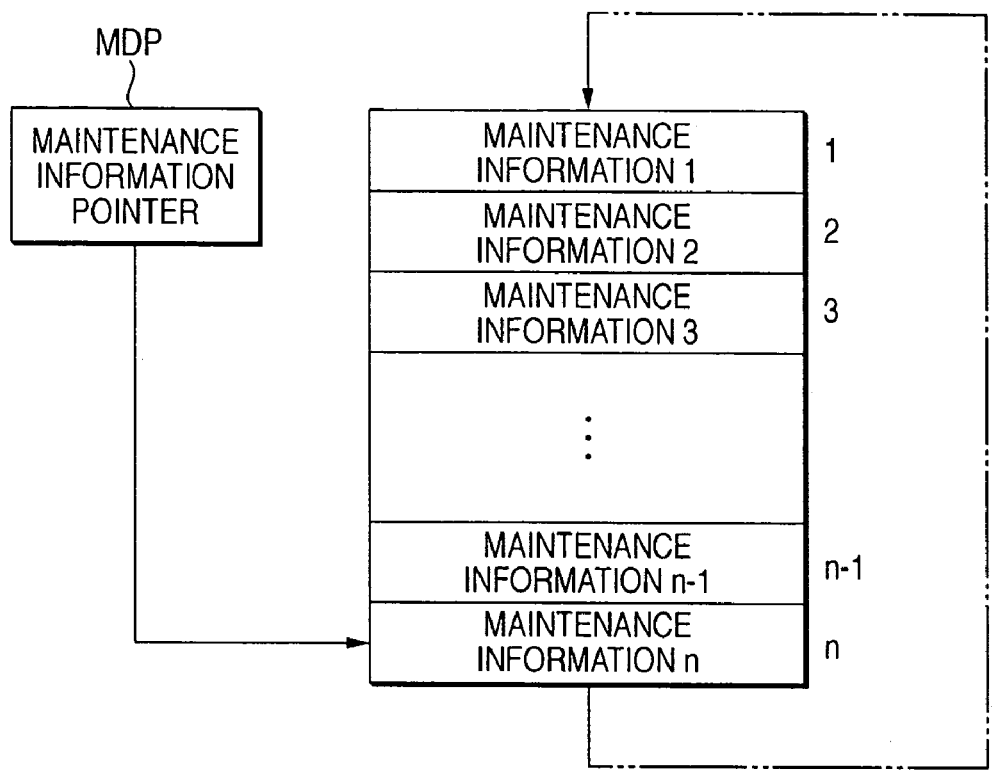
FIGS. 4A and 4B are diagrams which illustrate methods for storing data in nonvolatile memories of individual packages, and they illustrate a maintenance information storing method and a fault information storing method, respectively.

Next, methods for storing the maintenance information and the fault information in the nonvolatile memories will be described in conjunction with FIGS. 4A and 4B. FIG. 4A illustrates a maintenance information storing method, and FIG. 4B illustrates a fault information storing method.

The storage maintenance information will be considered first. As shown in FIG. 4A, the storage area for the maintenance information is set in a predetermined area of the nonvolatile memory. For example, about sixty four pieces of maintenance information can be stored in the maintenance information storage area. A maintenance information pointer MDP points to the address of the latest maintenance information. Each time a new maintenance operation is carried out so that the latest maintenance information is produced, the address of the maintenance information pointer is incremented by a predetermined value, so that the latest maintenance information is stored at the address pointed to by the maintenance information pointer. In case the value of the maintenance information pointer reaches the maximum, the pointer is reset to the first address. Therefore, the maintenance information storage area is used repeatedly like a ring buffer. Thus, the maintenance information storage area set in the nonvolatile memory can store a plurality of pieces of maintenance information and thereby manage the history of the maintenance information. In case the maintenance information is referred to, the latest maintenance information can be read out on the basis of the address pointed to by the maintenance information pointer. By changing the value of the read address, moreover, the maintenance information that is stored can be suitably read out wholly or partially.

Figure 4B:
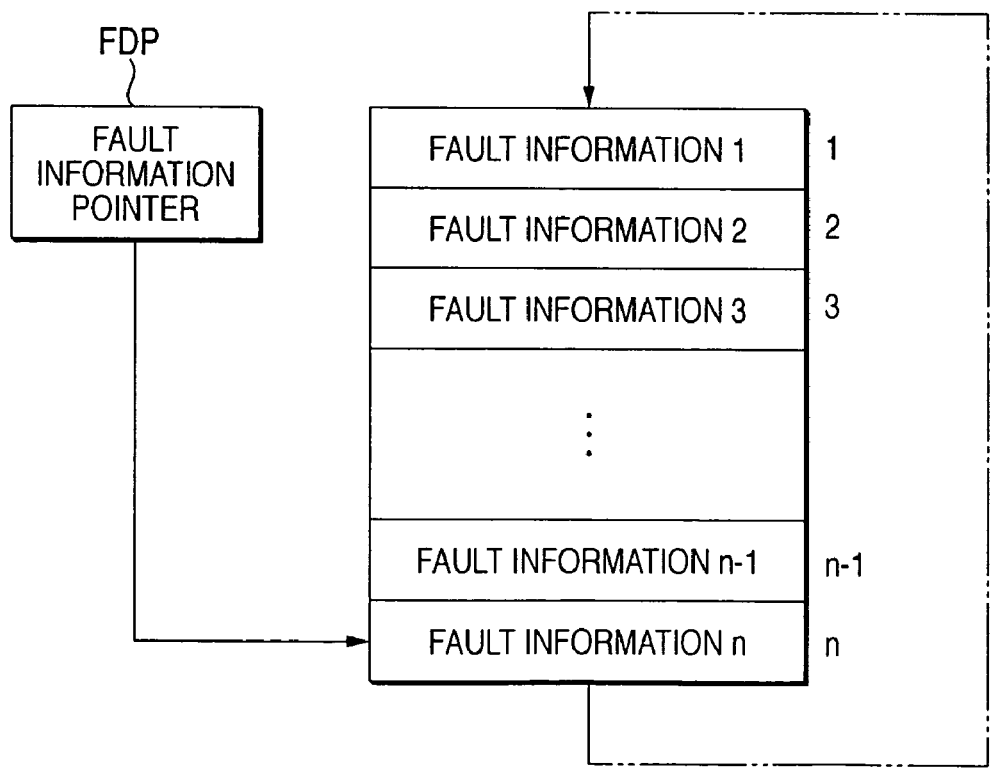

The fault information is stored like the maintenance information, as shown in FIG. 4B. Specifically, the fault information storage area for storing the fault information is preset in another portion of the nonvolatile memory. Moreover, about sixty four pieces of fault information are stored, for example, in the fault information storage area in accordance with the address pointed to by a fault information pointer FDP.

Figure 5:
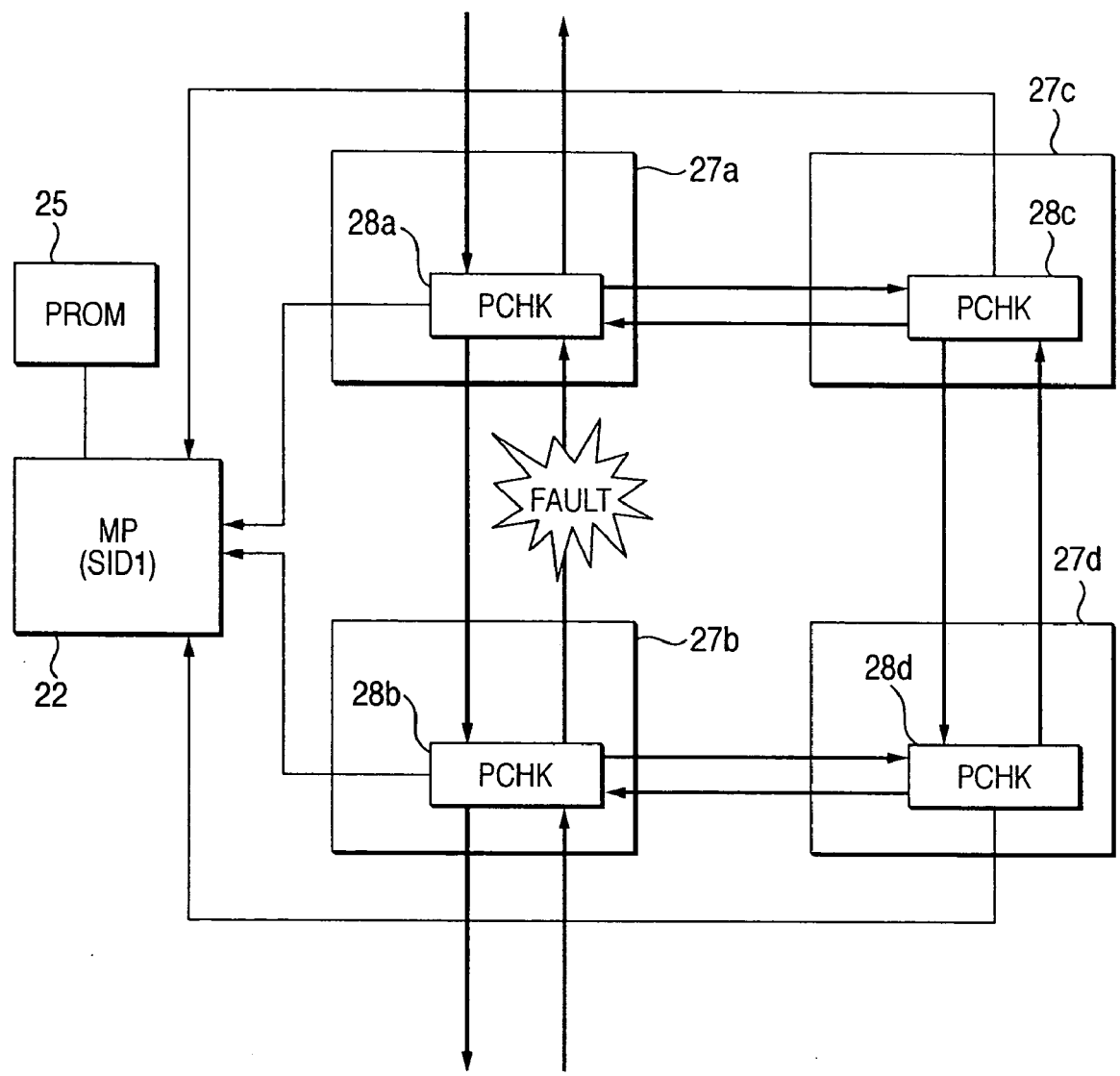
FIG. 5 is a schematic diagram showing one example of how to detect a fault which has occurred in a package and how to write related information in the nonvolatile memory.

The fault detection and the automatic storage of the fault information will be described in conjunction with FIG. 5. FIG. 5 is a block diagram showing a principal portion of a channel adapter 20. This channel adapter 20 is provided with a plurality of ASICs (Application Specific Integrated Circuits) 27a to 27d which make up a data processing unit, in addition to the MPU 22, the nonvolatile memory 25 and so on, as shown in FIG. 1. The data transferred in the channel adapter 20 is processed by the individual ASICs 27a to 27d. These individual ASICs 27a to 27d are provided with parity checkers 28a to 28d, respectively, for detecting an error at the data transferring time. Moreover, the overall operations of the individual ASICs 27a to 27d are controlled by the MPU 22.

It is now assumed that a transfer error has occurred while data is being transferred from the second ASIC 27b to the first ASIC 27a. When the data inputted to the first ASIC 27a are damaged, the occurrence of a transfer error is detected by the parity checker 28a of the first ASIC 27a. The parity checker 28a informs the MPU 22 of an parity error when it detects the parity error. On the basis of the error detection information from the parity checker 28a, the MPU 22 writes the fault information at a predetermined address of the nonvolatile memory 25.

Like another package, although not especially shown, the detection means, such as the parity checker, detects the occurrence of an error, in case the error occurs in the data transfer in the package or between the packages. The error detection information is inputted to the MPU or the controller so that the fault information is once written in the nonvolatile memory. Therefore, the faulty package is recovered, and the fault information is extracted from the nonvolatile memory of that package. Therefore, what packaging environment a fault has occurred in and when and what kind of the fault occurred can be identified for each package. Moreover, even the causal relation to the fault occurrence can be analyzed by extracting the maintenance information.

Figure 6:
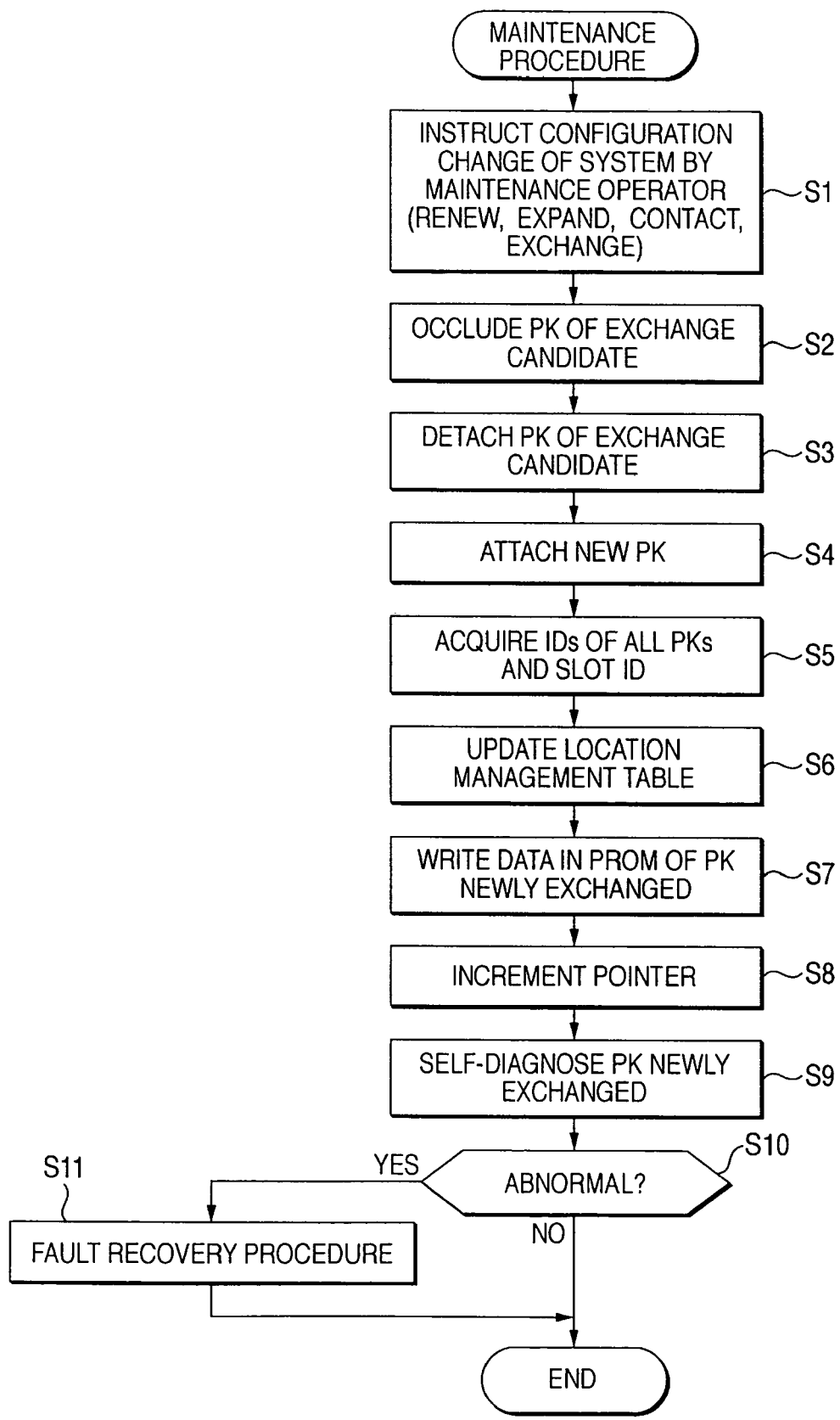
FIG. 6 is a flow chart showing the flow of a maintenance procedure for the package.
Figure 7:
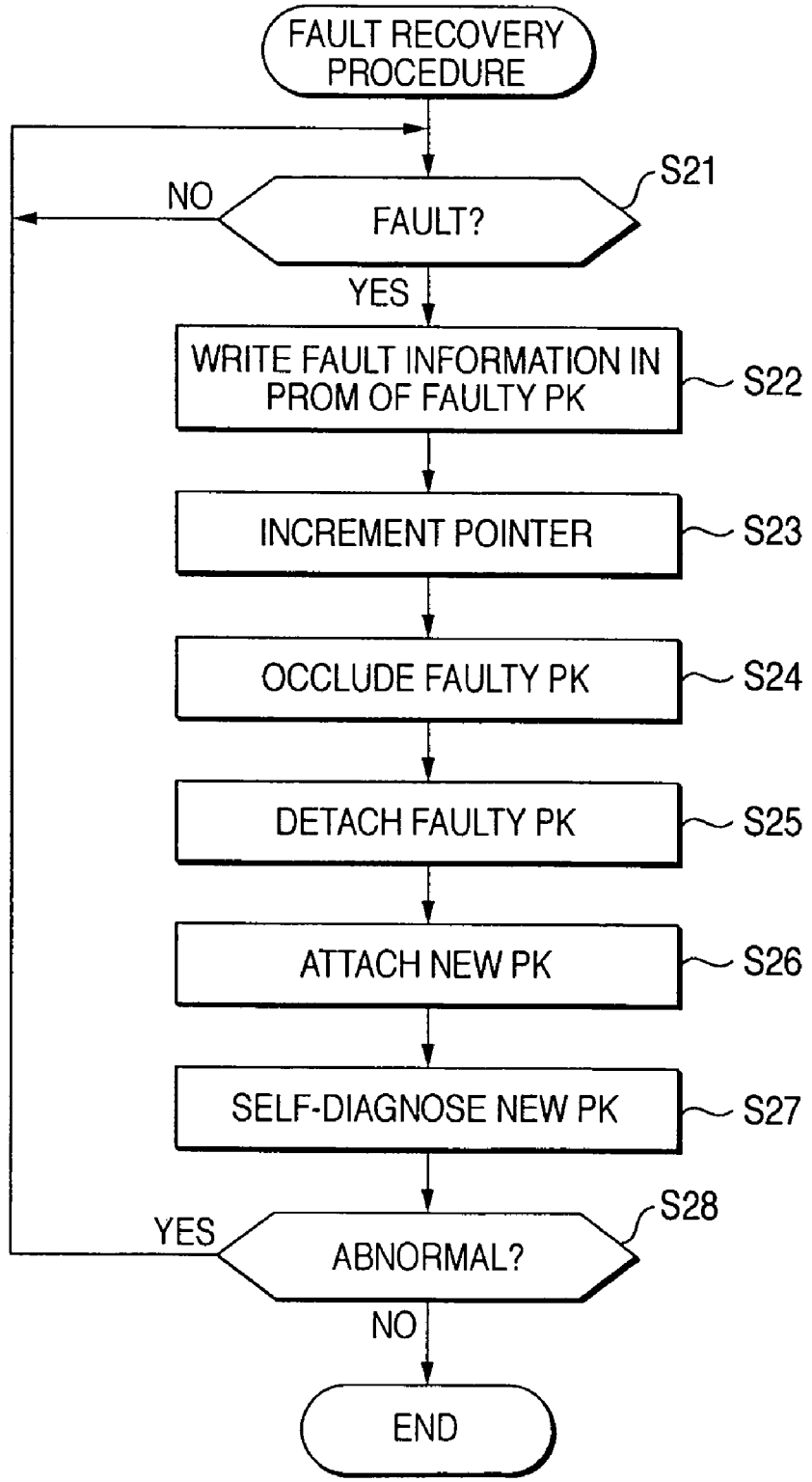
FIG. 7 is a flow chart showing the flow in a case in which a fault occurs in the package.

Next, the procedure employed during the maintenance operation and the procedure used for fault recovery will be described in conjunction with FIG. 6 and FIG. 7. In accordance with the present invention, each package can detect the occurrence of a fault or a maintenance operation automatically and can write it automatically in the nonvolatile memory. Alternatively, the maintenance information can also be written in the nonvolatile memory on the basis of an instruction from the maintenance/management terminal 100, and the fault information can also be detected for each package and written in the nonvolatile memory. FIG. 6 and FIG. 7 illustrate the procedure employed in the latter case. The procedure employed in the former case will be described hereinafter.

FIG. 6 illustrates the process flow in a case in which the package is exchanged. First of all, the maintenance operator operates the maintenance/management terminal 100 to instruct a change in the configuration of the storage system (at S1). For example, new install, expand, contract, exchange and so on of anew package can be enumerated as the configuration change. The exchange of the package is instructed in this case.

The package, the exchange of which has been instructed by the maintenance/management terminal 100, is shut down (at S2) so that it may be detached from the storage system. The maintenance operator detaches the shut down package from the storage system (at S3) and then mounts a new package in the storage system (at S4). The slot ID given to the old package is released by detaching the old package from the storage system. When the new package is mounted in the storage system, the platter assigns the slot ID to the new package.

When the package exchange has been completed, the package IDs and the slot IDs assigned to the individual packages are acquired from all of the packages mounted in the storage system (at S5) in response to the command from the maintenance/management terminal 100. Then, the contents of the location management table stored in the maintenance/management terminal 100 and the nonvolatile memories of all the packages are updated (at S6). Next, the MPU or the controller of the renewed package writes the contents (e.g., the "exchange" in this case) of the slot ID and its own maintenance operation in the maintenance information storage area of the nonvolatile memories (at S7), and the value of the maintenance information pointer MDP is then incremented (at S8).

The MPU of the package newly mounted on the storage system diagnoses itself (at S9). In case the self-diagnosis results in a finding of no abnormality (S10: NO), the procedure is ended. In case the self-diagnosis results in the finding of an abnormality (S10: YES), the procedure shifts to a fault recovery procedure (at S11), as will be described hereinafter. Here, the flow thus far described is merely one example, to which the invention should not be limited. For example, each package may make access to the maintenance/management terminal 100 on the basis of the configuration changing notice from the terminal 100 so that the latest location management table may be acquired and written in the nonvolatile memory of that package.

FIG. 7 illustrates the procedure used for fault recovery. As has been described hereinbefore in conjunction with FIG. 6, each package diagnoses itself to determine whether or not a fault has occurred therein, using a parity checker or the like. In case a fault occurs in the package (S21: YES), the MPU of the faulty package or the controller at first writes the fault information in the fault information storage area of the nonvolatile memory (at S22), and it increments the fault information pointer FDP (at S23).

Next, the faulty package is shut down (at S24). After this shut down operation has been completed, the faulty package is detached from the storage system by the maintenance operator (at S25). Next, the maintenance operator attaches a spare package to the storage system (at S26). The faulty package is thus detached from the storage system so that the slot ID assigned to that package is released. When a normal package is mounted in the storage system, on the other hand, the slot ID is assigned. Then, the renewed package diagnoses itself (at S27). In case the self-diagnosis results in a finding of no abnormality (S28: NO), the procedure is ended. In case the self-diagnosis results in the finding of an abnormality (S28: YES), the routine returns to S21, from which the aforementioned operations are repeated.

Figure 8:
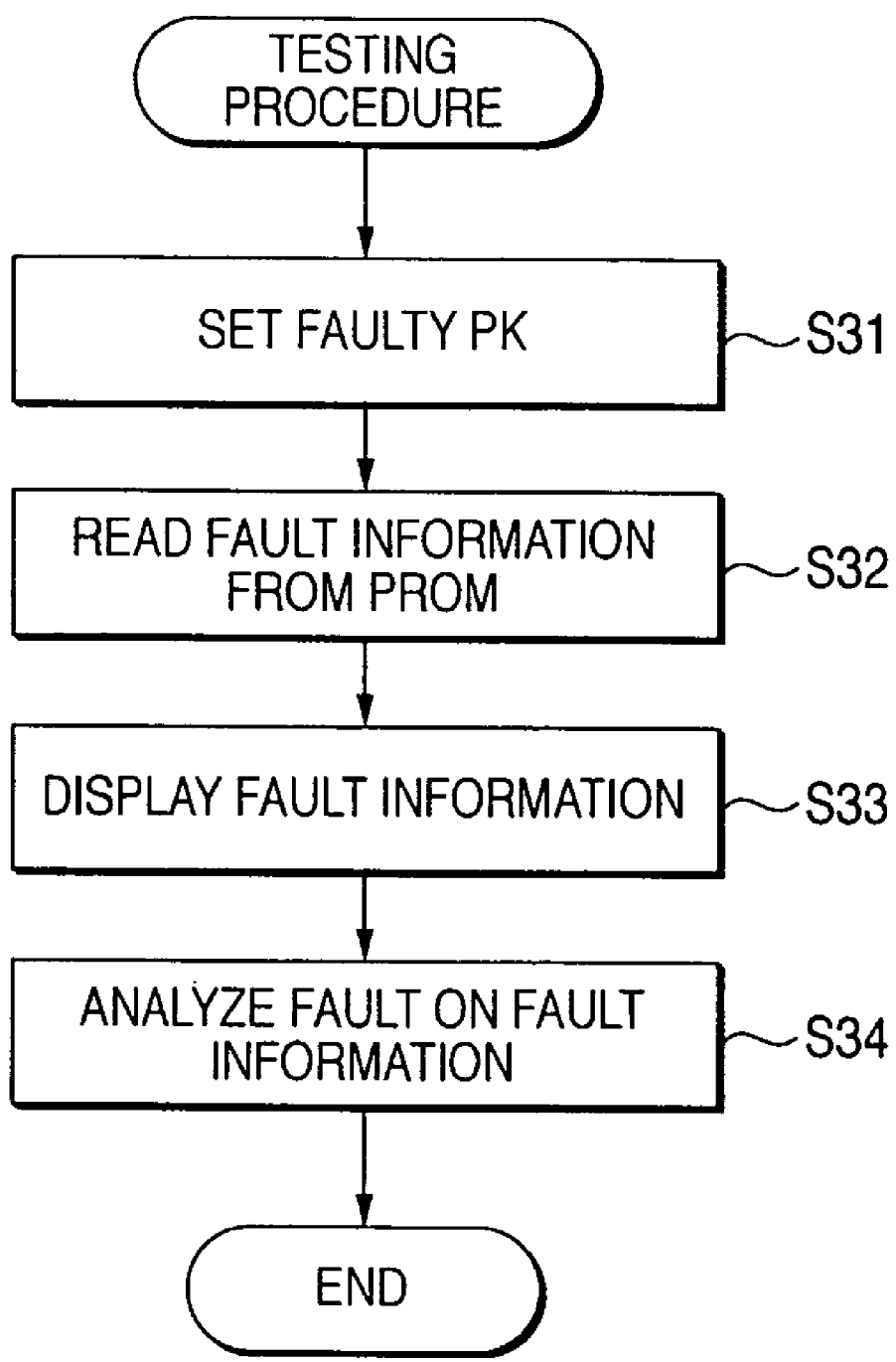
FIG. 8 is a flow chart showing the flow in a case in which the situation of the package is analyzed.

Next, a procedure which is used in the case where the package detached from the storage system is tested will be described in conjunction with FIG. 8. At first, the package to be examined is connected with a computer terminal (at S31). The data can be read out from the nonvolatile memory in the package by wireless communication, but the computer terminal and the single package can also be connected by electric wiring.

Next, the computer terminal connected with the package reads out fault information from the fault information storage area of the nonvolatile memory in the package (S32). The fault information which is read out is displayed in the display screen of the computer terminal. The analyzer can analyze the cause of the fault or the like on the basis of the fault information that is displayed. Here, it is possible to read out not only the latest fault information, but also the whole fault information stored in the nonvolatile memory. Moreover, a more specific examination can be performed by reading not only the fault information, but also the maintenance information.

The present embodiment thus far described has the following effects. At first, a configuration is employed in which a nonvolatile memory is mounted in each package so as to record the information on various events (e.g., a maintenance operation or a fault) that have occurred in the package. Therefore, the data managed by the maintenance/management terminal 100 need not be separately extracted, but the situation concerning the package can be grasped by the single package.

On the other hand, the nonvolatile memory in the package contains not only the contents relating to a fault, maintenance contents and the date but also the device number information for specifying the kind of storage system to which the package has been attached, and the package location information on the attached position of the package. Therefore, it is possible to grasp what kind of storage system includes the package that has failed, where the package has been attached and how the package has failed.

As has been described in conjunction with FIG. 3, moreover, the package location information contains the management table, which indicates the entire configuration on what package is attached to the actual device slot. Therefore, the analyzer can easily grasp what kind of storage system the package to be examined belongs and what positional relation the package has with another package.

Moreover, not only the latest event information, but also the past event information, is stored in the nonvolatile memory so that the history of the package can also be easily grasped.

Because of the configuration in which the storage area of the nonvolatile memory is repeatedly used as in a ring buffer, moreover, the history of the event information can be efficiently stored without increasing the storage capacity.

2. Second Embodiment

A second embodiment of the invention will be described in conjunction with FIG. 9 and FIG. 10. This embodiment is characterized in that each package is provided with a transmitter in addition to the nonvolatile memory, so that the information stored in the nonvolatile memory can be extracted from the outside by wireless communication.

Figure 9:
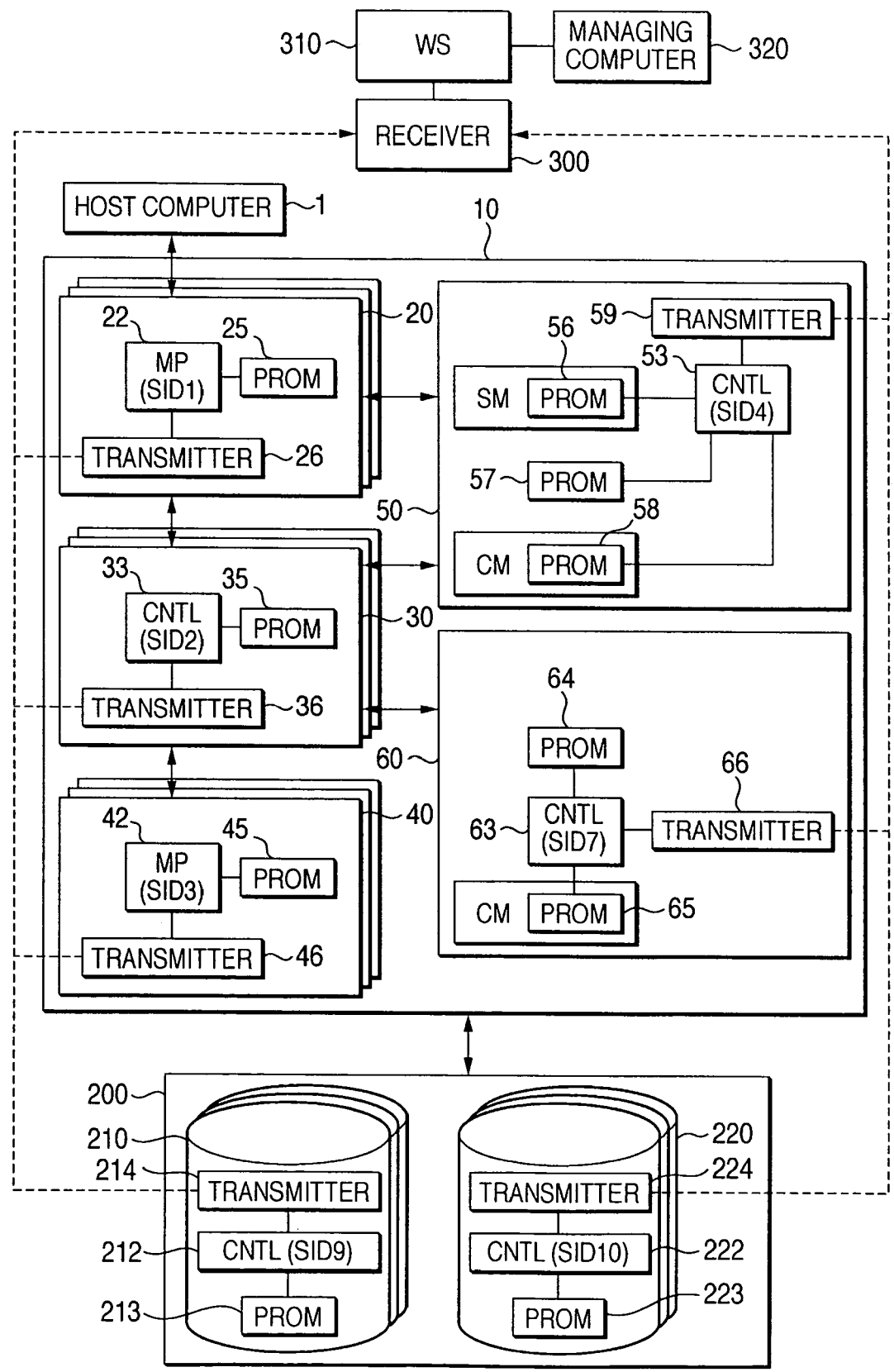
FIG. 9 is an overall block diagram of a storage system according to a second embodiment of the invention.
Figure 10A:
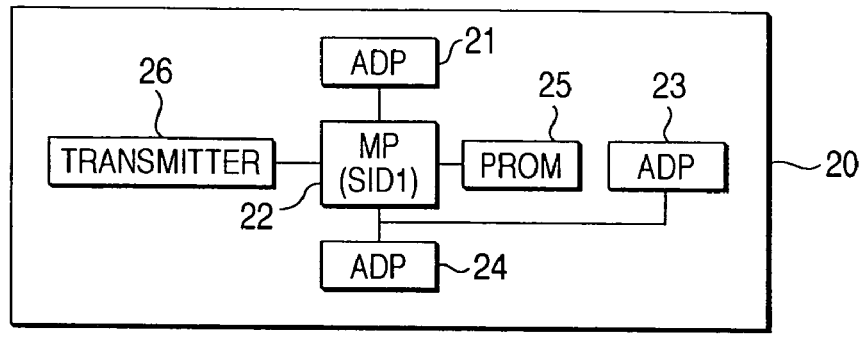
FIGS. 10A, 10B, 10C and 10D illustrate the configurations of individual packages having a transmitter, and they illustrate a channel adapter, a cache switch, a disk adapter and a disk drive, respectively.
Figure 10B:
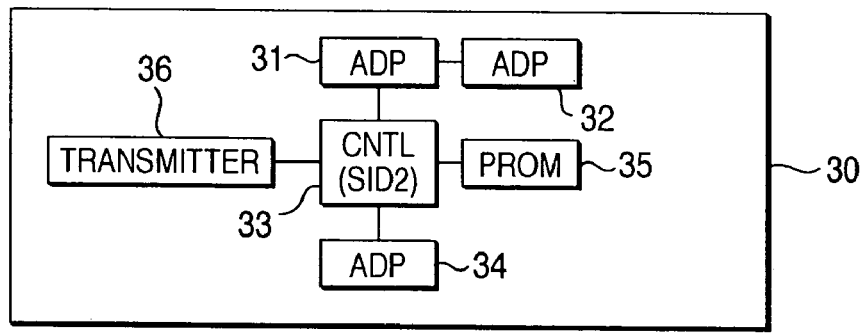
Figure 10C:
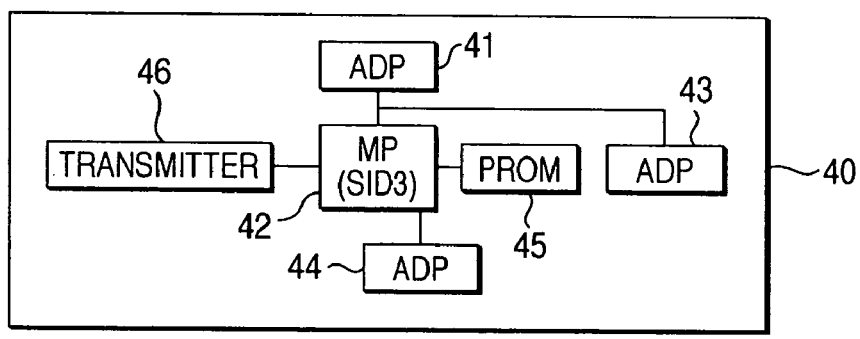
Figure 10D:
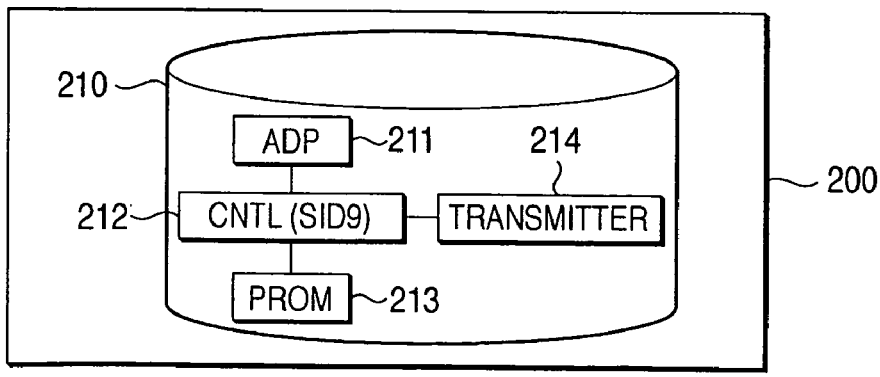

FIG. 9 is an overall block diagram of a storage system according to this embodiment. For convenience of description, the adapters for connecting the individual packages and the maintenance/management terminal are omitted from FIG. 9. The configuration including the adapters is shown in FIGS. 10A to 10D. FIGS. 10A, 10B, 10C and 10D illustrate a channel adapter, a cache switch, a disk adapter and a disk drive, respectively.

As shown in FIG. 9, each package is provided with a transmitter. Specifically, a transmitter 26 is connected with the MPU 22 of each channel adapter 20. A transmitter 36 is connected with the controller 33 of each cache switch 30. Moreover, a transmitter 46 is connected with the MPU 42 of each disk adapter 40. A transmitter 59 is connected with the controller 53 of each basic memory board 50. A transmitter 66 is connected with the controller 63 of each memory board expansion 60. Moreover, transmitters 214 and 224 are connected with the controllers 212 and 222 of the individual disk drives 210 and 220, respectively.

These transmitters 26, 36, 46, 59, 66, 214 and 224, which are packaged in the individual packages, can perform data communications wirelessly (or contactlessly) by a short-range wireless communication method or the like, for example. The signals transmitted from the individual transmitters are received by a receiver 300. A workstation 310 transfers the signals received by the receiver 300 to a managing computer 320 through a communication network, such as a LAN. The workstation 310 operates as a relay station. In case the distance between the managing computer 320 and the storage system is short, the receiver 300 can be directly connected with the managing computer 320, thereby to collect data of the individual packages directly in the managing computer 320.

This embodiment, as thus configured, can also achieve effects similar to those of the foregoing embodiment. In this embodiment, moreover, the stored contents of the nonvolatile memory can be transmitted to the outside by wireless communication so that the data of the nonvolatile memory can be more simply read out to analyze the package without any electrical wiring required.

3. Third Embodiment

Next, a third embodiment of the present invention will be described in conjunction with FIG. 11. This embodiment is characterized in that the contents of the maintenance operation are automatically detected by the single package, not according to an instruction from the maintenance/management terminal 100, so that the maintenance information is at first written in the nonvolatile memory.

Figure 11:
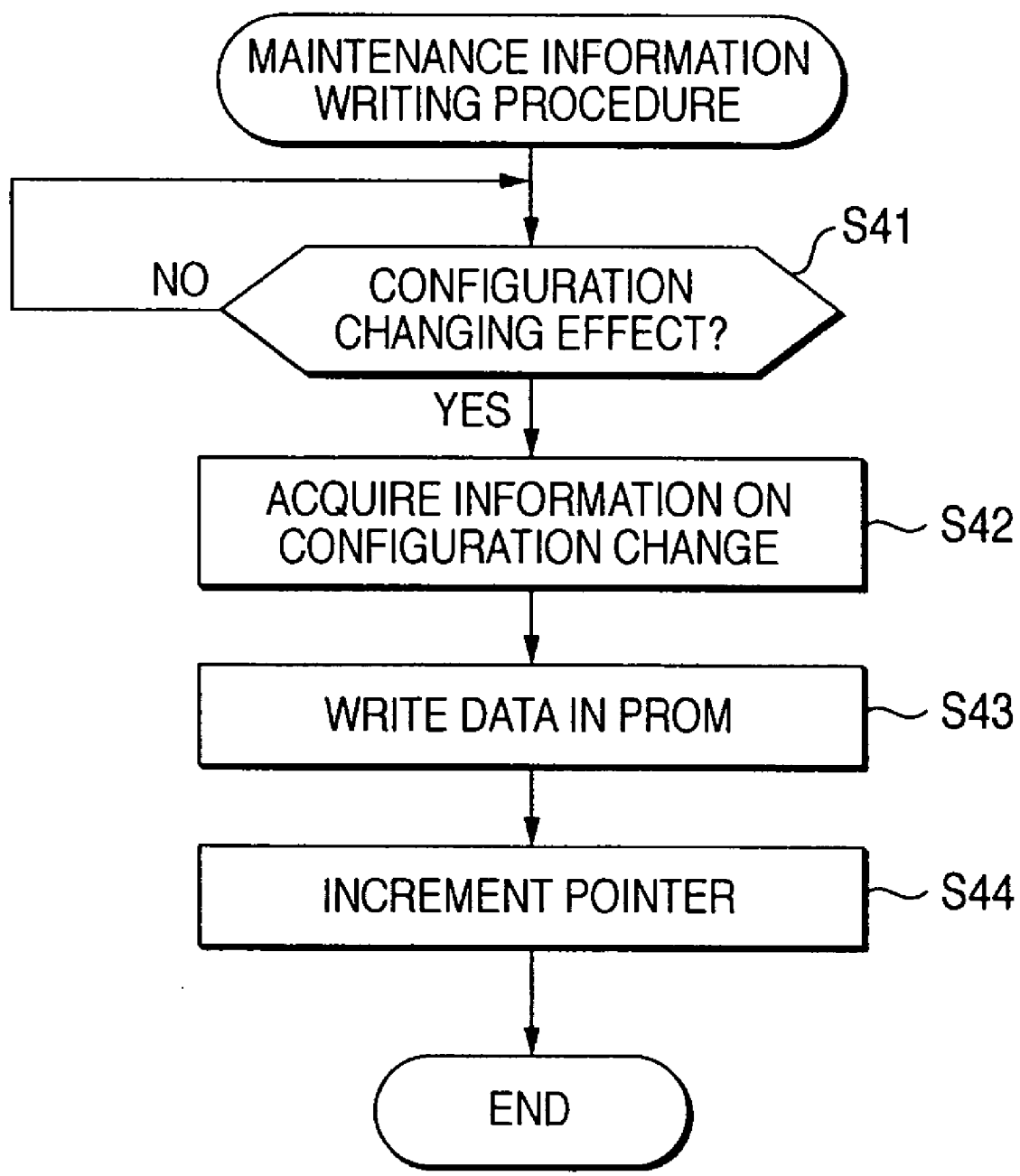
FIG. 11 is a flow chart showing the flow for acquiring and recording maintenance information automatically according to a third embodiment of the invention.

Specifically, FIG. 11 illustrates a procedure for creating the maintenance information automatically and writing it in the nonvolatile memory. At first, the MPU or controller of the package monitors whether or not a configuration-changed event has occurred (at S41). As such a device changing event, for example, there can be enumerated whether or not the event itself has been newly installed in the storage system, whether or not the event itself is to be logically isolated from the storage system, and so on. In the case of a new package, the slot ID is not assigned yet to the package. When the package is installed in the storage system, the slot ID is assigned from the platter of the storage system. By assigning the slot ID, therefore, it is possible to detect whether or not the package has been mounted on the storage system. In case the package was already mounted, on the other hand, the detachment from the storage system can be detected on the basis of whether or not a shut down operation of the occlusion has been instructed.

In case the event of the device change has occurred (S41: YES), information on the new install or the change is acquired (at S42), and the maintenance information is once written in the maintenance information storage area of the nonvolatile memory (at S43). Moreover, the value of the maintenance information pointer MDP is incremented (at S44).

4. Fourth Embodiment

A fourth embodiment of the present invention will be described in conjunction with FIG. 12 and FIG. 13. This embodiment is characterized in that the package is shut down without any noise and in that the fault or the like can be analyzed for the single package.

Figure 12:
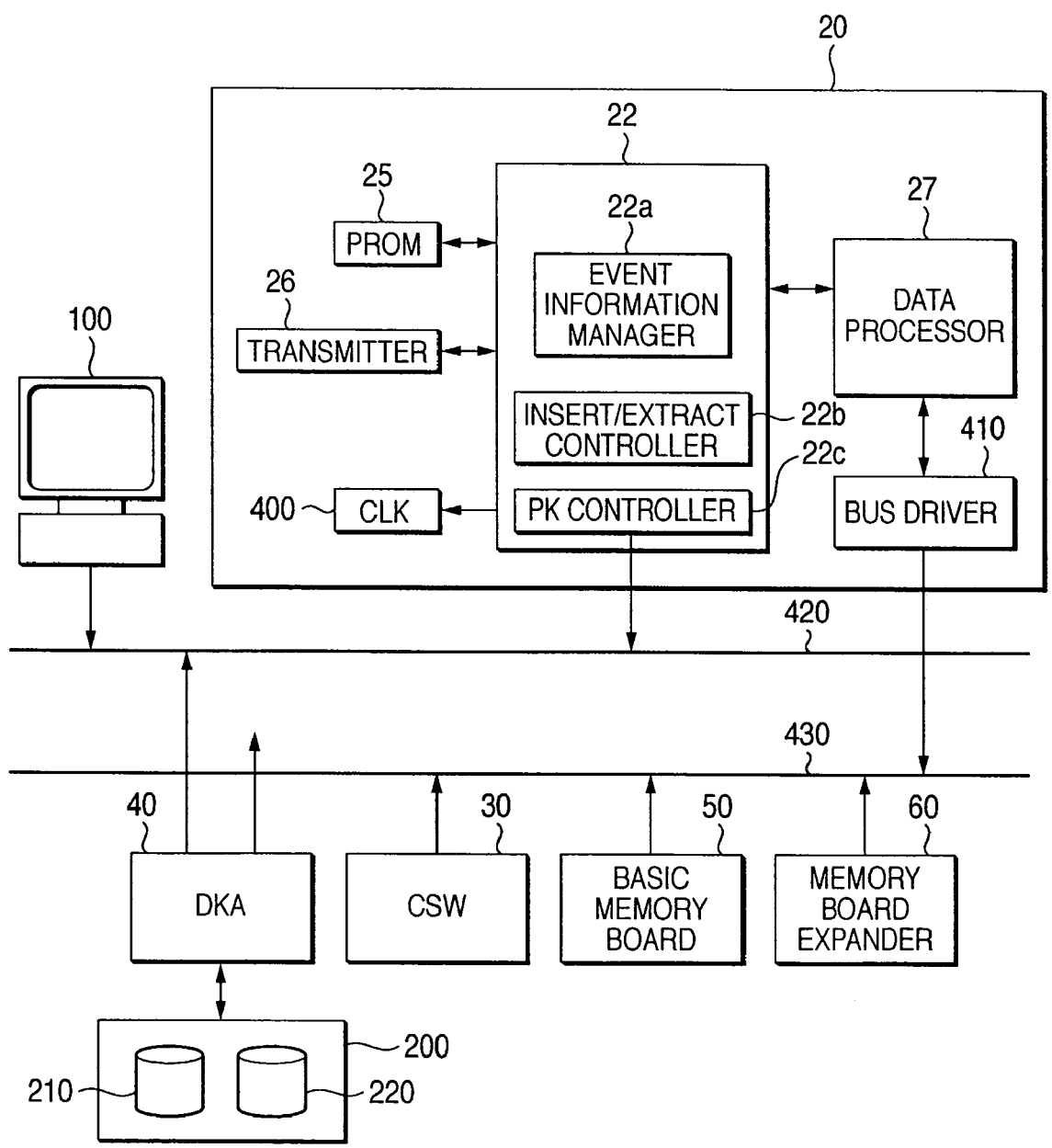
FIG. 12 is an overall block diagram of a storage system according to a fourth embodiment of the invention.

FIG. 12 is an overall block diagram of a storage system according to this embodiment. For convenience of description, the configuration of the channel adapter 20 is exclusively shown in detail in FIG. 12. The channel adapter 20 is provided with the MPU 22, the nonvolatile memory 25, the transmitter 26, a data processor 27, a clock circuit 400 and a bus driver 410.

The storage system shown in FIG. 12 and the storage system described in conjunction with FIG. 1 have basically identical configurations although they are illustrated differently. The substantial differences between the two storage systems basically reside in two points: that the storage system shown in FIG. 12 is provided with a clock circuit in each package; and that the MPU in the package performs a function for shut down of the package. The adapter in charge of communications between the individual packages is contained in the bus driver 410. Moreover, the data processor 27 is made up of a plurality of ASICs, as has been described in conjunction with FIG. 5.

The individual packages are connected with a shared bus 430, including a control bus and a data bus. Moreover, each channel adapter 20 and each disk adapter 40 are connected with a maintenance information bus 420 leading to the maintenance/management terminal 100.

The MPU 22 is provided as its internal functions with an event information manager 22a, an insert/extract controller 22b and a package controller 22c. The event information manager 22a writes the information (i.e., the maintenance information and the fault information) concerning an event that has occurred in its own package in the nonvolatile memory 25, or reads the event information stored in the nonvolatile memory 25 in response to the command from the maintenance/management terminal 100. The insert/extract controller 22b performs an initialization of the package, a self-diagnosis or shut down of the operation thereof. The package controller 22c monitors the action state of the package and instructs the insert/extract controller 22b to effect shut down of the package in case the package has failed.

Figure 13:
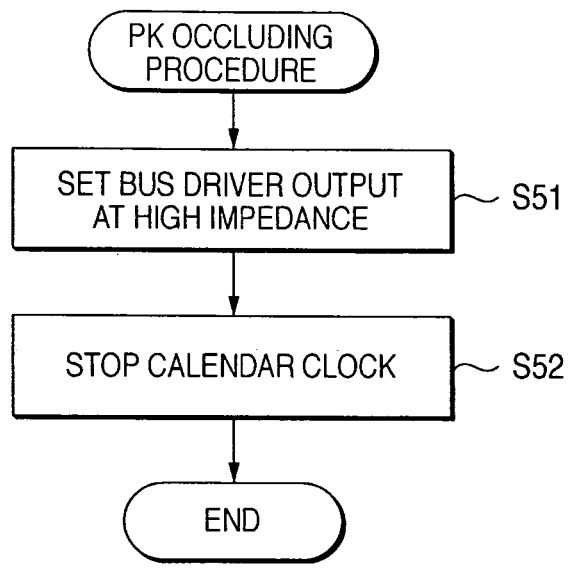
FIG. 13 is a flow chart showing the flow for shutting down the package.

As shown in FIG. 13, the insert/extract controller 22b sets the bus driver 410 to a high impedance state, when shut down of the package is instructed, and it isolates the package logically from the shared bus 420 (at S51). Moreover, the insert/extract controller 22b outputs a reset signal to the clock circuit 400 and the data processor 27, thereby to stop the function of the package (at S52).

When the package stops its action, its power consumption decreases so that no noise occurs in the power line of the shared bus 420. Moreover, the bus driver 410 is set to the high-impedance state so that no noise occurs in the control bus and the data bus of the shared bus.

Moreover, the MPU of each channel adapter 20 and each disk adapter 40 can also instruct the shut down of another package, i.e., each cache switch 30, each basic memory board 50, each memory board expander 60 and the individual disk drives 210 and 220.

Figure 14:
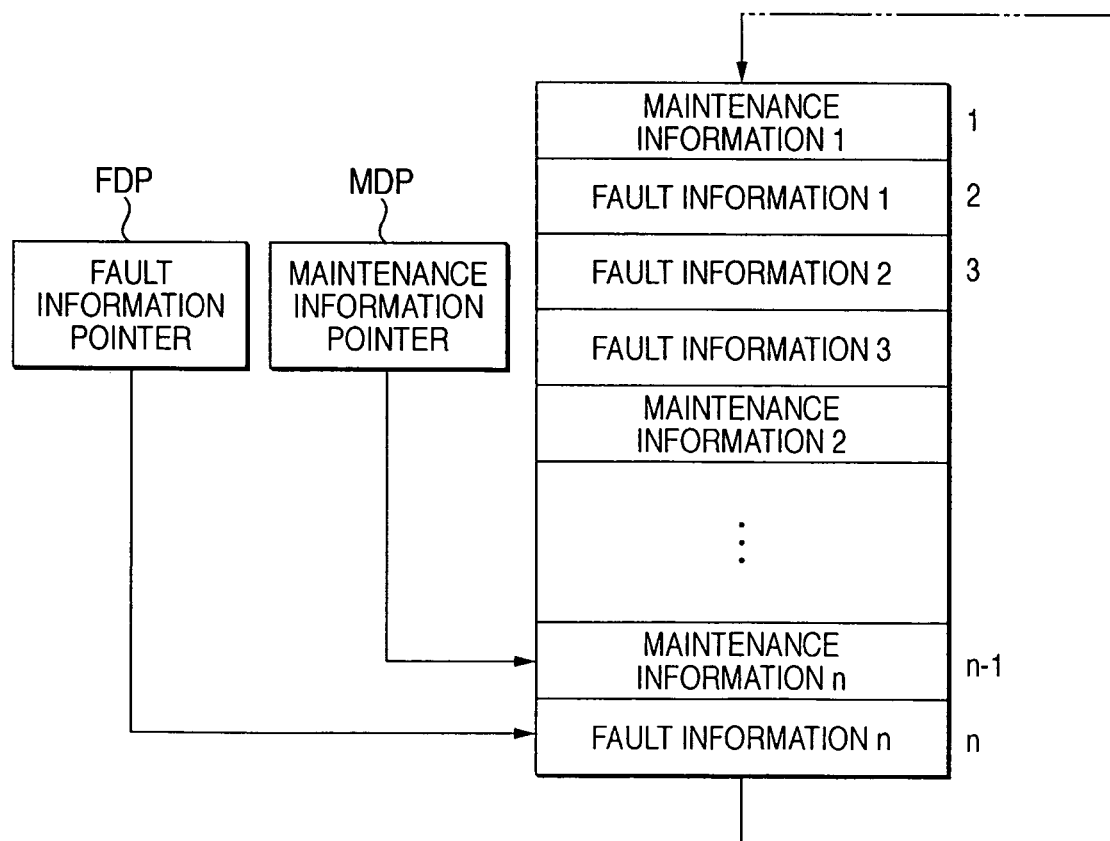
FIG. 14 is a diagram showing a method for storing the maintenance information and the fault information according to a modification of the invention.

Here, the invention should not be limited to the individual embodiments thus far described. Those skilled in the art could make various additions, modifications and so on within the scope of the invention. As shown in FIG. 14, for example, the maintenance information and the fault information could be stored in the shared storage area of the nonvolatile memory.

We claim:

1. A storage system comprising:
a plurality of different kinds of exchangeable functional parts for storing data for use by a host device,
wherein said functional parts are packages which perform different functions of said storage system,
wherein each package can be decoupled from said storage system and exchanged with a new package which can then be coupled to said storage system;
wherein said packages include:
channel adapter packages which function to communicate data with said host device,
cache memory packages which function to temporarily store data that is transferred from said channel adapter packages,
disk adapter packages having a control function to store data stored in said cache memory packages in a plurality of disk drives;
switch packages which function to transfer data mutually among said channel adapter packages, said cache memory packages and said disk adapter packages, and
a shared memory package in which control information is written concerning control of said storage system including said channel adapter, said disk adapter, said cache memory and said switch packages;
wherein each of said packages includes memory means;
wherein each of said memory means stores event information which is configured so as to exhibit a correspondence between an event which has occurred during operation of a package which includes said memory means and packaging position information which describes a location of said package, which includes said memory means, in said storage system; and
wherein said event information stored in said memory means of each package is accessible by a user to determine a status of a particular package independent of the other packages.

2. A storage system according to claim 1, wherein said event information can be read from or written in said memory means from at least either the inside or outside of each of said packages.

3. A storage system according to claim 1, wherein at least either maintenance information concerning maintenance of each of said packages or fault information concerning a fault of each of said packages is used as said event information.

4. A storage system according to claim 1, wherein each of said packages is provided with event detecting means for detecting whether or not a predetermined event has occurred, and
wherein, in case each of said event detecting means detects said predetermined event, said event information is stored in a memory means corresponding to each of said event detecting means.

5. A storage system according to claim 1, wherein each of said packages is provided with wireless communication means for transmitting said event information read from said memory means, wirelessly to the outside of each of said functional parts through said wireless communication means.

6. A storage system according to claim 1, wherein at least two or more kinds of a channel adapter for controlling the data transfer with said host device, a disk storage for storing the data to be utilized by said host device, a disk adapter for controlling the data transfer with said disk storage, a cache memory for temporarily storing the data to be transferred between said host device and said disk storage, a cache switch for controlling the interface of said cache memory, and a shared memory shared among said individual parts are provided as said packages.

7. A storage system according to claim 1, wherein said event information includes:
   identification information for identification from another piece of event information;
   information of the date of an event occurrence;
   identification information of said storage system;
   information on the packaging position of a corresponding one of said packages in said storage system; and
   event contents.

8. A storage system according to claim 1, wherein said packaging position information includes at least a location management table composed of:
   inherent identification information preset in each of said packages; and
   mounting position information given from said storage system to each of said packages in case each of said packages is attached to said storage system.

9. A storage system according to claim 1, wherein each of said packages includes shut down means for stopping the function of said each of said packages and for inserting/extracting a live wire.

10. A storage system according to claim 1, wherein said memory means is stored with event information as a history.

11. A storage system according to claim 1, wherein said memory means is constructed as write once nonvolatile memory means.

12. A method for maintaining a storage system including a plurality of different kinds of exchangeable functional parts for storing data for use by a host device,
   wherein said functional parts are packages which perform different functions of said storage system,
   wherein each package can be decoupled from said storage system and exchanged with a new package which can then be coupled to said storage system,
   wherein said packages include:
      channel adapter packages which function to communicate data with said host device;
      cache memory packages which function to temporarily store the data transferred from said channel adapter packages;
      disk adapter packages having a control function to store data stored in said cache memory packages, in a plurality of disk drives;
   switch packages which function to transfer data mutually among said channel adapter packages, said cache memory packages and said disk adapter packages; and
   a shared memory part in which control information is written concerning control of said storage system including said channel adapter, said disk adapter said cache memory, and said switch packages, and
   wherein each of said packages includes memory means, and
   wherein the method comprising:
      a step of detecting whether or not an event of a maintenance operation or a fault has occurred during operation of a package which includes said memory means;
      a step of storing, if said event has been detected, event information constructed so as to exhibit a correspondence between packaging position information which describes a location of said package, which includes said memory means, in said storage system and said detected event in said memory means;
      a step of shutting down the operation of said package for which said event has been detected;
      a step of extracting said shut down package from said storage system; and
      a step of acquiring said event information from said memory means disposed in said extracted package,
      wherein said event information stored in said memory means of each package is accessible by a user to determine a status of a particular package independent of the other packages.

* * * * *